United States Patent
Tokita et al.

(10) Patent No.: US 10,106,904 B2
(45) Date of Patent: Oct. 23, 2018

(54) METHOD FOR ELECTROLYTICALLY REFINING LEAD IN SULFAMATE BATH

(71) Applicant: JX Nippon Mining & Metals Corporation, Tokyo (JP)

(72) Inventors: Yujiro Tokita, Hitachi (JP); Hidetoshi Sasaoka, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 0 days.

(21) Appl. No.: 14/957,370

(22) Filed: Dec. 2, 2015

(65) Prior Publication Data

US 2016/0160369 A1 Jun. 9, 2016

(30) Foreign Application Priority Data

Dec. 3, 2014 (JP) .................................. 2014-245302
Nov. 11, 2015 (JP) .................................. 2015-221585

(51) Int. Cl.
*C25C 7/06* (2006.01)
*C25C 1/18* (2006.01)

(52) U.S. Cl.
CPC .................. *C25C 7/06* (2013.01); *C25C 1/18* (2013.01); *Y02P 10/212* (2015.11)

(58) Field of Classification Search
CPC ............ C25C 1/18; C25C 7/06; Y02P 10/212
See application file for complete search history.

(56) References Cited

U.S. PATENT DOCUMENTS

| | | | | |
|---|---|---|---|---|
| 3,985,630 A | * | 10/1976 | Ginatta ..................... | C25C 1/18 205/544 |
| 4,098,658 A | * | 7/1978 | Ginatta ..................... | C25C 1/18 205/597 |
| 5,520,794 A | * | 5/1996 | Gernon ..................... | C25C 1/18 205/598 |
| 2014/0008238 A1 | * | 1/2014 | Zhou ........................ | C25C 3/34 205/367 |

FOREIGN PATENT DOCUMENTS

| | | |
|---|---|---|
| JP | 59-64791 A | 4/1984 |
| JP | 2010-248608 A | 11/2010 |
| JP | 5163988 B2 | 3/2013 |

* cited by examiner

*Primary Examiner* — Ciel P Thomas
(74) *Attorney, Agent, or Firm* — Birch, Stewart, Kolasch & Birch, LLP

(57) ABSTRACT

In the electrolytic refining of lead in a sulfamate bath, the production of a white residue is suppressed, and a decrease in the lead concentration in the electrolytic solution is suppressed. A method for electrolytically refining lead in a sulfamate bath, comprising performing electrolytic refining at a decomposition rate of sulfamic acid controlled at 0.06%/day or less.

2 Claims, 1 Drawing Sheet

METHOD FOR ELECTROLYTICALLY REFINING LEAD IN SULFAMATE BATH

BACKGROUND OF THE INVENTION

Field of the Invention

The present invention relates to a method for electrolytically refining lead in a sulfamate bath and particularly to a method for electrolytically refining lead in a sulfamate bath which recovers lead contained in dry flue dust generated from nonferrous smelting, melting furnaces for recycle raw materials such as boards and electronic parts, and dry furnaces for the melting treatment of industrial waste.

Description of the Related Art

In order to recover lead contained in dry flue dust in nonferrous smelting from nonferrous smelting, melting furnaces for recycle raw materials such as boards and electronic parts, and dry furnaces for the melting treatment of industrial waste, the flue dust is subjected to sulfuric acid leaching to form lead sulfate, and then the lead sulfate is subjected to smelting reduction in an electric furnace. The metal separated by the smelting reduction is treated with soda, and then the metal is cast into an anode and then electrolytically refined in a sulfamate bath to recover lead.

As such an electrolytic refining technique for lead, for example, Japanese Patent No. 5163988 discloses a method for electrolyzing lead in which in electrolytic refining in a sulfamate bath, electrolysis is performed at a first-stage current density of 50 A/m$^2$ or less for 2 hours or more, and then electrolysis is performed at 100 A/m$^2$ or less as a second stage to recover high purity lead. It is described that according to such a configuration, also for a high Bi grade anode, high purity lead can be recovered.

Problems are that when the conventional electrolytic refining of lead in a sulfamate bath is carried out, a white residue is seen in the bath liquid, and further the lead concentration in the electrolytic solution decreases. In other words, the white residue is deposited at the bottom of the electrolytic cell, and when the white residue is deposited to some extent, it needs to be removed from the electrolytic cell, and for this purpose, the electrolysis is stopped. When the amount of the white residue is large, its frequency increases. In addition, when a decrease in the lead concentration in the electrolytic solution is seen, the electrodeposition condition of lead may worsen. The cause is that sulfamic acid during the electrolytic refining of lead in the sulfamate bath decomposes by the following reaction, and the white residue is deposited as lead sulfate, and the lead concentration in the electrolytic solution decreases.

$SO_2NH_2^- + H_2O \rightarrow SO_4^{2-} + NH_4^+$ $Pb^{2+} + SO_4^{2-} \rightarrow PbSO_4\downarrow$.

SUMMARY OF THE INVENTION

The present inventors have repeated studies in order to solve the above problems, and found that by controlling the decomposition rate of sulfamic acid at a predetermined value or less, the production of a white residue can be suppressed and a decrease in the lead concentration in the electrolytic solution can be suppressed in the electrolytic refining of lead in a sulfamate bath.

The present invention completed with the above findings as a background is, in one aspect, a method for electrolytically refining lead in a sulfamate bath using a lead anode, comprising performing electrolytic refining at a decomposition rate of sulfamic acid controlled at 0.06%/day or less.

In one embodiment of the method for electrolytically refining lead in a sulfamate bath according to the present invention, electrolytic refining is performed with sulfamic acid concentration in a sulfamate bath adjusted to a concentration 20 to 60 g/L higher than lead concentration in the sulfamate bath.

In another embodiment of the method for electrolytically refining lead in a sulfamate bath according to the present invention, electrolytic refining is performed with electrolytic solution temperature in the sulfamate bath adjusted to 15 to 30° C.

According to the present invention, in the electrolytic refining of lead in a sulfamate bath, the production of a white residue can be suppressed, and a decrease in the lead concentration in the electrolytic solution can be suppressed. The frequency of removing the white residue from the electrolytic cell can be suppressed. In addition, by suppressing a decrease in the lead concentration in the electrolytic solution, the control of the lead concentration is easy, and a good electrodeposition condition of lead is obtained. Further, there is also the effect of decreasing the frequency of replenishment with sulfamic acid during the electrolytic refining.

DETAILED DESCRIPTION OF THE PREFERRED EMBODIMENTS

Figure 1:
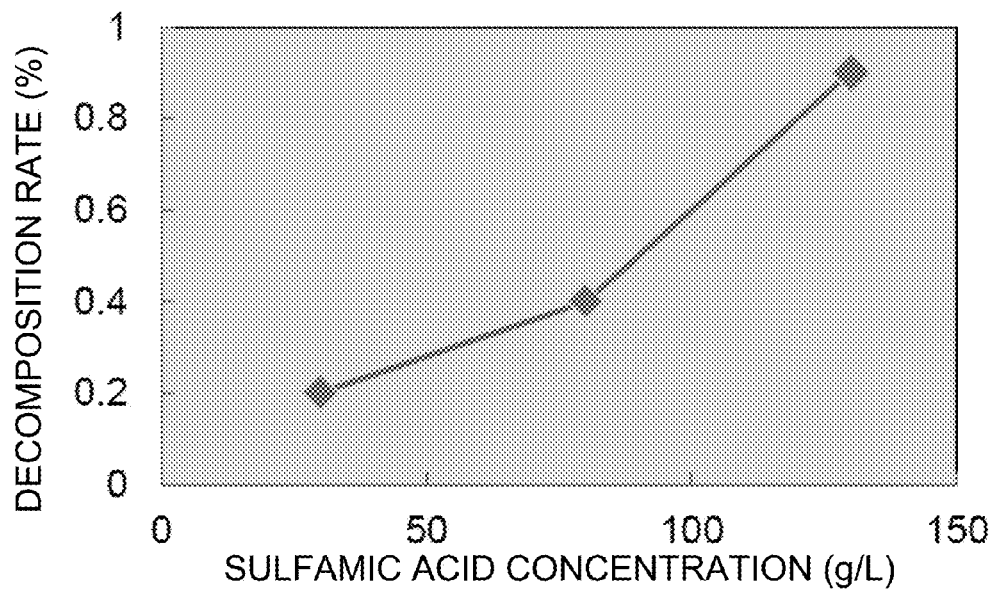
FIG. 1 is a graph representing the relationship between sulfamic acid concentration and the decomposition rate of sulfamic acid in Experimental Example 1.

The present invention will be described in more detail below.

In a method for electrolytically refining lead in a sulfamate bath according to the present invention, electrolytic refining is performed with the decomposition rate of sulfamic acid controlled at 0.06%/day or less. Further, electrolytic refining is preferably performed with the sulfamic acid concentration in the sulfamate bath adjusted to a concentration 20 to 60 g/L higher than the lead concentration in the sulfamate bath, and electrolytic refining is preferably performed with the electrolytic solution temperature in the sulfamate bath adjusted to 15° C. to 30° C.

The anode reaction and the cathode reaction in the electrolytic refining of lead in a sulfamate bath are shown below:

$Pb + 2SO_3NH_2^- \rightarrow Pb(SO_3NH_2)_2 + 2e^-$  Anode reaction:

$Pb(SO_3NH_2)_2 + 2e^- \rightarrow Pb + 2SO_3NH_2^-$  Cathode reaction:

The raw material (lead-containing material) to be electrolytically refined is not particularly limited. Examples thereof include a lead-containing material obtained by treating copper ore in a flash smelter and a converter, then treating the converter flue dust with sulfuric acid, then turning the resulting lead sulfate into lead carbonate with sodium carbonate, then subjecting the lead carbonate to smelting reduction in an electric furnace, and treating the separated metal with soda. For the components of the raw material (lead-containing material) to be electrolytically refined, lead should be the main component and be 60 mass % or more, and the raw material (lead-containing material)

may be, for example, a lead-containing material containing 70 to 90 mass % of lead, 0.04 mass % of tin, and 5 to 30 mass % of bismuth.

The above lead-containing material is cast in the shape of an anode, and electrolytic refining is performed using it for the anode. By making the size of the anode smaller than the size of the cathode, an edge effect can be prevented, and smooth and good electrodeposited lead can be recovered.

By controlling the decomposition rate of sulfamic acid in the electrolytic solution at 0.06%/day or less, the deposition of lead sulfate can be decreased. In addition, a decrease in the lead concentration in the electrolytic solution can be suppressed. Further, the deterioration of sulfamic acid during the electrolytic refining of lead in the sulfamate bath can be suppressed well to suppress the frequency of replenishment with sulfamic acid. On the other hand, when the decomposition rate of sulfamic acid is more than 0.06%/day, the generation of lead sulfate increases, and the dissolution of lead from the anode is not enough, causing a decrease in the lead concentration in the electrolytic solution. Further, the generation of a large amount of lead sulfate stops the electrolytic refining and increases the frequency of the removal of lead sulfate deposited at the bottom of the electrolytic cell. In addition, when the decomposition of sulfamic acid proceeds, replenishment with sulfamic acid becomes frequent in order to maintain the predetermined concentration of sulfamic acid. The decomposition rate of sulfamic acid is preferably 0.04%/day or less, more preferably 0.02%/day or less.

The sulfamic acid decomposition rate (d) is represented by the following formula:

$$d = A_d/A_0$$

$A_d$: the amount of decomposed sulfamic acid $$A_d = \text{residue weight} \times \text{Pb grade} \times (97/207)$$

The above "97" is sulfamic acid molecular weight, and the above "207" is Pb atomic weight.

$A_0$: the initial amount of sulfamic acid

In the present invention, the sulfamic acid decomposition rate is a sulfamic acid decomposition rate per day, and the amount of decomposed sulfamic acid per day is desirably calculated as an average from residue weight after 5 days.

The sulfamic acid concentration in the electrolytic solution is preferably adjusted to a concentration 20 to 60 g/L higher than the lead concentration (g/L) in the electrolytic solution (hereinafter also referred to as an excess). For example, the sulfamic acid concentration in the electrolytic solution in the present invention is preferably adjusted to 100 to 140 g/L when the lead concentration in the electrolytic solution is 80 g/L. To be precise, the concentration of sulfamic acid should be represented as the concentration of the number of moles with respect to the number of moles of lead, but actually, there is no problem even if the sulfamic acid concentration is compared with the concentration of lead as it is because the molecular weight of sulfamic acid is close to the atomic weight of lead.

When the sulfamic acid concentration in the electrolytic solution is a concentration more than 60 g/L higher than the lead concentration (g/L) in the electrolytic solution, the decomposition rate of sulfamic acid increases, and it is difficult to control the decomposition rate of sulfamic acid at 0.06%/day or less. On the other hand, when the sulfamic acid concentration in the electrolytic solution is a concentration less than 20 g/L higher than the lead concentration (g/L) in the electrolytic solution, the addition of sulfamic acid may be ineffective. During the electrolysis, the decomposition of sulfamic acid proceeds, and the concentration decreases, and therefore by adding sulfamic acid as needed, an excess of 20 g/L or more can be maintained. But, when the decomposition rate of sulfamic acid is more than 0.06%/day, the frequency of addition increases, and the deposition of lead sulfate increases.

The electrolytic solution temperature in the sulfamate bath is preferably 15° C. to 30° C. When the electrolytic solution temperature is more than 30° C., the decomposition of sulfamic acid during the electrolytic refining of lead in the sulfamate bath may increase, and further the increase of the decomposition of sulfamic acid may increase the deposition of lead sulfate and decrease the lead concentration in the electrolytic solution. However, when the electrolytic solution temperature is too low, the electrodeposition condition of lead may worsen, and therefore the electrolytic solution temperature is preferably 15° C. or more, more preferably 20° C. or more.

The lead concentration in the electrolytic solution is preferably 60 to 80 g/L. By such a configuration, a good electrodeposition condition of lead electrodeposited on the cathode is obtained by electrolytic refining. When the decomposition rate of sulfamic acid is more than 0.06%/day, a decrease in the lead concentration in the electrolytic solution is seen, and therefore it is difficult to control the lead concentration in the electrolytic solution in the proper range. Therefore, when the decomposition rate of sulfamic acid is 0.06%/day or less, it is easy to adjust the lead concentration in the electrolytic solution in the narrow range of 60 to 80 g/L. The lead concentration in the electrolytic solution is more preferably 70 to 80 g/L.

As a smoothing agent, another component in the electrolytic solution, 1 to 700 mg/L of NOIGEN BN-1390 (hereinafter "NOIGEN" is a registered trademark) or NOIGEN BN-2560 is preferably added. Thus, smoother and better electrodeposited lead can be recovered. NOIGEN BN-1390 and NOIGEN BN-2560 are nonionic surfactants comprising polyoxyethylene mononaphthyl ether as the main component and are products of DKS Co. Ltd. NOIGEN BN-1390 is a nonionic surfactant comprising 90% of polyoxyethylene mononaphthyl ether with the remainder being water.

The current density of the electrolysis is preferably controlled at 50 to 100 A/m². Thus, smoother and better electrodeposited lead can be recovered.

EXAMPLES

Examples of the present invention will be shown below. These Examples are provided to understand the present invention and advantages thereof better and are not intended to limit the invention.

Experimental Example 1: Influence of Sulfamic Acid Concentration

As the composition of an electrolytic solution, NOIGEN BN-1390 as a smoothing agent was added at 10 mg/L to a solution whose lead concentration and sulfamic acid concentration were adjusted to concentrations described in Table 1. Lead plates obtained by casting a lead-containing material, as anodes, and stainless steel plates as cathodes were alternately inserted into an electrolytic cell. After the electrodes were inserted, the electrolytic cell was replenished with the above electrolytic solution, and the electrolytic solution was supplied so that the residence time of the electrolytic solution in the electrolytic cell was about 1 hour, and thus the concentration distribution in the electrolytic cell was made uniform. Electrolytic refining was performed for 5 days by passing current at a current density described in Table 1 while adjusting the liquid temperature of the electrolytic solution at a temperature described in Table 1. The electrodeposited lead was recovered. In addition, in Example 1-2, Example 1-3, Example 1-4, and Example 1-5, the decomposition rate of sulfamic acid [%] for 5 days was controlled at 0.3% or less.

As a result, in Example 1-1, significant roughness appeared on the electrodeposited surface, and in Example 1-6 and Example 1-7, a decrease in the lead concentration in the electrolytic solution could not be suppressed. In addition, in Example 1-6, the decomposition rate of sulfamic acid was 0.4%, and in Example 1-7, the decomposition rate of sulfamic acid was 0.9%. On the other hand, in Example 1-2, Example 1-3, Example 1-4, and Example 1-5, the production of a white residue was suppressed, and a decrease in the lead concentration in the electrolytic solution was suppressed. FIG. 1 shows a graph representing the sulfamic acid decomposition rates of Example 1-3 (the excess of sulfamic acid concentration: 30 g/L), Example 1-6 (the excess of sulfamic acid concentration: 80 g/L), and Example 1-7 (the excess of sulfamic acid concentration: 130 g/L). In Tables 1 and 2, "Sulfamic acid concentration (excess)" represents "the sulfamic acid concentration of the electrolytic solution (the portion exceeding the concentration of lead in the electrolytic solution)."

TABLE 1

| | Electrolytic solution | | | |
|---|---|---|---|---|
| | Sulfamic acid concentration (excess) g/L | Pb concentration g/L | Temperature °C. | Current density A/m² |
| Example 1-1 | 80 (0) | 80 | 25 | 100 |
| Example 1-2 | 100 (20) | | | |
| Example 1-3 | 110 (30) | | | |
| Example 1-4 | 120 (40) | | | |
| Example 1-5 | 140 (60) | | | |
| Example 1-6 | 160 (80) | | | |
| Example 1-7 | 210 (130) | | | |

Experimental Example 2: Influence of Electrolysis Temperature

As the composition of an electrolytic solution, NOIGEN BN-1390 as a smoothing agent was added at 10 mg/L to a solution whose lead concentration and sulfamic acid concentration were adjusted to concentrations described in Table 2. Lead plates obtained by casting a lead-containing material, as anodes, and stainless steel plates as cathodes were alternately inserted into an electrolytic cell. After the electrodes were inserted, the electrolytic cell was replenished with the above electrolytic solution, and the electrolytic solution was supplied so that the residence time of the electrolytic solution in the electrolytic cell was about 1 hour, and thus the concentration distribution in the electrolytic cell was made uniform. Electrolytic refining was performed for 5 days by passing current at a current density described in Table 2 while adjusting the liquid temperature of the electrolytic solution at a temperature described in Table 2. The electrodeposited lead was recovered. In addition, in Example 2-2 and Example 2-3, the decomposition rate of sulfamic acid [%] for 5 days was controlled at 0.3% or less.

Figure 2:
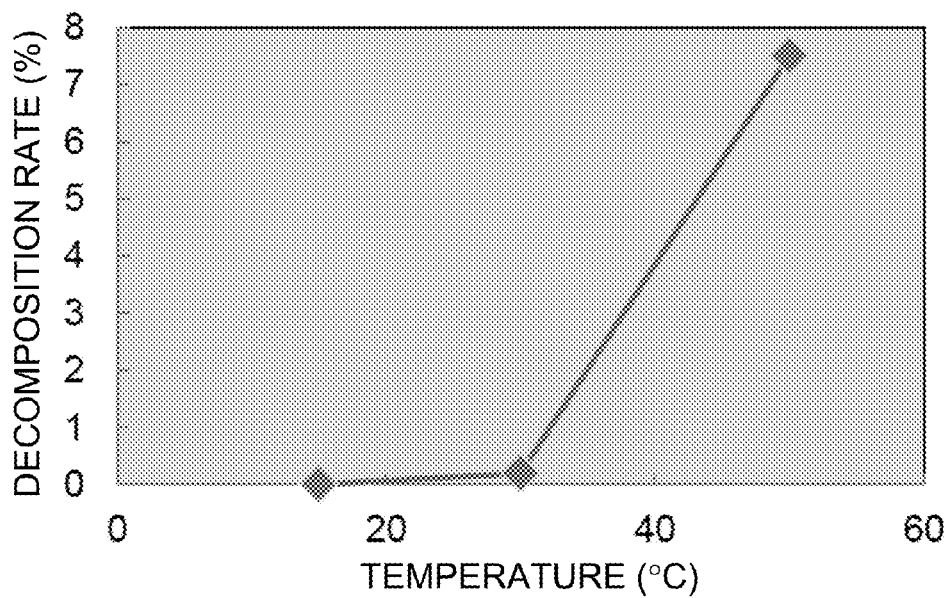
FIG. 2 is a graph representing the relationship between electrolytic solution temperature and the decomposition rate of sulfamic acid in Experimental Example 2.

As a result, in Example 2-1, the electrodeposition of lead worsened. On the other hand, in Example 2-5 and Example 2-6, a decrease in the lead concentration in the electrolytic solution could not be suppressed. In addition, in Example 2-5, the decomposition rate of sulfamic acid was more than 3.5%, and in Example 2-6, the decomposition rate of sulfamic acid was more than 7%. On the other hand, in Example 2-2, Example 2-3, and Example 2-4, the production of a white residue was suppressed, and a decrease in the lead concentration in the electrolytic solution was suppressed. FIG. 2 shows a graph representing the sulfamic acid decomposition rates of Example 2-2 (electrolytic solution temperature: 15° C.) Example 2-4 (electrolytic solution temperature: 30° C.), and Example 2-6 (electrolytic solution temperature: 50° C.)

TABLE 2

| | Electrolytic solution | | | |
|---|---|---|---|---|
| | Sulfamic acid concentration (excess) g/L | Pb concentration g/L | Temperature °C. | Current density A/m² |
| Example 2-1 | 100 (20) | 80 | 10 | 100 |
| Example 2-2 | | | 15 | |
| Example 2-3 | | | 20 | |
| Example 2-4 | | | 30 | |
| Example 2-5 | | | 40 | |
| Example 2-6 | | | 50 | |

What is claimed is:

1. A method for electrolytically refining lead in a sulfamate bath using a lead anode, comprising performing electrolytic refining using the lead anode which comprises 70 to 90 mass % of lead and 5 to 30 mass % of bismuth in the sulfamate bath in which 1 to 700 mg/L of nonionic surfactant comprising polyoxyethylene mononaphthyl ether is added at a decomposition rate of sulfamic acid controlled at 0.06%/day or less for at least 5 days to suppress a production of a white residue and decrease of the lead concentration in the sulfamate bath by adding sulfamic acid to the sulfamate bath,
   wherein the electrolytic refining is performed with the sulfamic acid concentration in the sulfamate bath adjusted to a concentration 20 to 60 g/L higher than lead concentration in the sulfamate bath and with the lead concentration in the sulfamate bath adjusted to a concentration of 60 to 80 g/L, and
   the electrolytic refining is performed with electrolytic solution temperature in the sulfamate bath adjusted to 15 to 30° C.

2. The method of claim 1, wherein performing electrolytic refining comprises controlling a current density of electrolysis at 50 to 100 A/m².

* * * * *